United States Patent [19]
Hall

[11] Patent Number: 6,021,325
[45] Date of Patent: Feb. 1, 2000

[54] MOBILE TELEPHONE HAVING CONTINUOUS RECORDING CAPABILITY

[75] Inventor: David Charles Hall, Raleigh, N.C.

[73] Assignee: Ericsson Inc., Research Triangle Park, N.C.

[21] Appl. No.: 08/814,065

[22] Filed: Mar. 10, 1997

[51] Int. Cl.⁷ .................................................. H04M 11/10
[52] U.S. Cl. ......................... 455/412; 455/466; 455/557
[58] Field of Search ..................... 455/412, 413, 455/466, 550, 551, 557

[56] References Cited

U.S. PATENT DOCUMENTS

| | | |
|---|---|---|
| 4,573,140 | 2/1986 | Szeto . |
| 4,672,670 | 6/1987 | Wang et al. ............................. 704/212 |
| 5,134,717 | 7/1992 | Rasmussen ............................. 455/575 |
| 5,251,250 | 10/1993 | Obata et al. ............................. 455/412 |
| 5,687,216 | 11/1997 | Svensson ................................ 455/412 |
| 5,867,793 | 2/1999 | Davis ..................................... 455/556 |

FOREIGN PATENT DOCUMENTS

| | | | |
|---|---|---|---|
| 0700192 | 3/1996 | European Pat. Off. ......... | H04M 1/65 |
| 0751496 | 1/1997 | European Pat. Off. .......... | G10L 9/18 |
| 2751157 | 1/1998 | France .............................. | H04N 5/91 |
| 19535612 | 3/1996 | Germany ........................ | H04M 1/64 |
| 06152800 | 5/1994 | Japan ............................. | H04M 11/10 |

*Primary Examiner*—Reinhard J. Eisenzopf
*Assistant Examiner*—Sam Bhattacharya
*Attorney, Agent, or Firm*—David C. Hall; Kevin A. Sembrat

[57] ABSTRACT

A mobile telephone has a receiver, a transmitter, a microprocessor and an associated memory. The memory includes a first-in-first-out (FIFO) queue and a static buffer. An audio signal carried by the mobile telephone is digitized and provided to the microprocessor. The resulting digital signal is continuously written to the FIFO queue. In response to a first command from the mobile telephone user, the microprocessor causes the contents of the FIFO queue to be transferred to the static buffer. Upon a second command from the user, the contents of the buffer are converted to an analog signal and played back over the mobile telephone's speaker.

25 Claims, 5 Drawing Sheets

MOBILE TELEPHONE HAVING CONTINUOUS RECORDING CAPABILITY

BACKGROUND OF THE INVENTION

1. Field of Invention

The present invention relates generally to mobile telephones. More specifically, the present invention relates to a mobile telephone having the capability of continuously recording audio signals received and transmitted by the mobile telephone.

2. Description of Related Art

Mobile telephones are convenient, widely used devices which provide a user with the ability to communicate even when away from the office, on the road, at a worksite, etc. It is often necessary when using a mobile telephone to make notes and memos about the conversation, for example, to record a telephone number or address. Usually, when using a mobile telephone, the user is not at his or her desk, and may often not have a pencil and notepad readily available to take notes about a conversation. Even if a pencil and paper are available, they may not be practical to use. Thus, there is a need in the art for an apparatus to permit the user of a mobile telephone to record memos and messages from a telephone call over a mobile telephone.

SUMMARY OF THE INVENTION

It is, therefore, an object of the present invention to provide a mobile telephone having the capability of recording and playing back messages. It is a further object of the invention to provide a mobile telephone which can capture and store audio signals received by the mobile telephone's audio processing circuitry for future playback.

The foregoing and other objects are accomplished in a mobile telephone having a receiver, a transmitter, a microprocessor and an associated memory. The memory includes a first-in-first-out (FIFO) queue and a static buffer. In an analog mobile telephone, audio signals received by the receiver and over the mobile telephone's microphone are digitized and combined. The resulting digital signal is continuously written to the FIFO queue. In response to a first command from the mobile telephone user, the microprocessor causes the contents of the FIFO queue to be transferred to the static buffer. Upon a second command from the user, the contents of the buffer are converted to analog and played back over the mobile telephone's speaker. In a digital mobile telephone, the received audio signal is already a digital signal. Thus, the received audio signal does not have to be digitized prior to being combined with the signal from the microphone.

These and other objects of the invention, together with features and advantages thereof will become apparent from the following detailed specification when read with the accompanying drawings in which like reference numerals refer to like elements.

DETAILED DESCRIPTION OF THE PREFERRED EMBODIMENTS

The present invention will now be described with reference to the accompanying drawings, in which a preferred embodiment of the invention is shown. However, this invention may be embodied in many different forms and should not be construed as limited to the specific embodiment shown.

Figure 1:
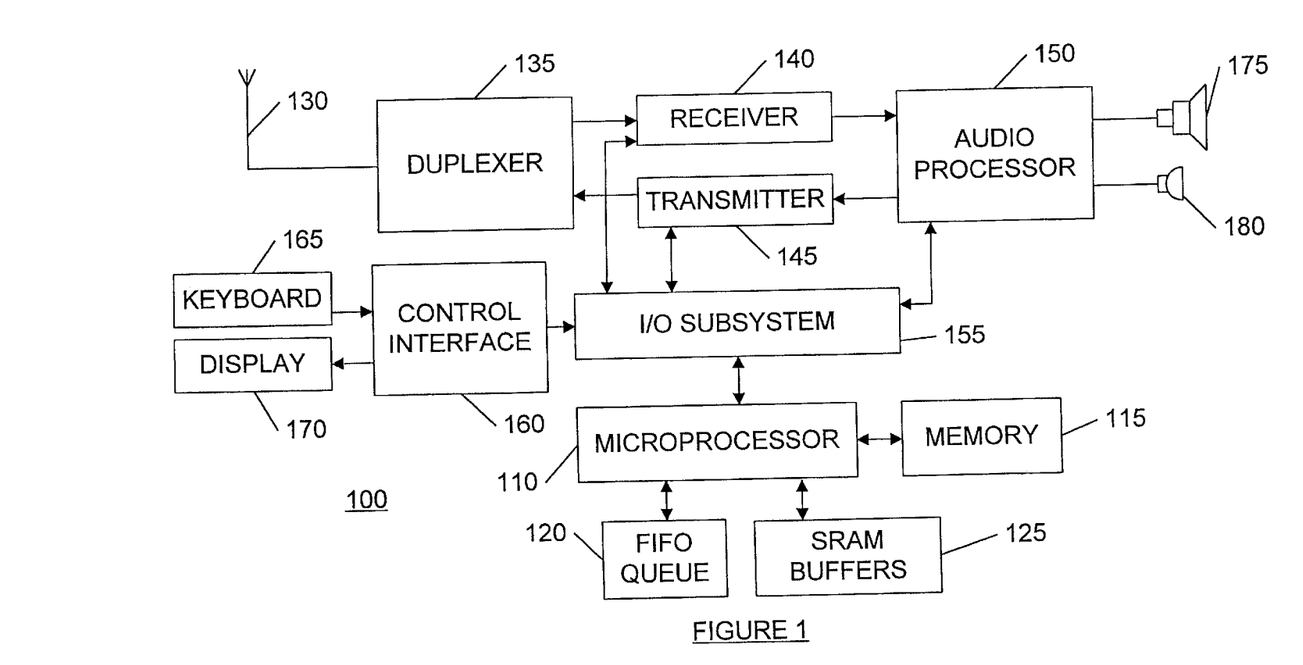
FIG. 1 is a block diagram of an embodiment of the present invention.

Referring now to FIG. 1, a digital mobile telephone 100 is shown in block diagram format. Mobile telephone 100 has an antenna 130 by which radio frequency (RF) signals are received and transmitted. Antenna 130 is coupled by means of duplexer 135 to a receiver 140 and a transmitter 145, which are in turn coupled to an audio processor 150. Attached to audio processor 150 are a microphone 180 and a speaker 175. Audio signals picked up by microphone 180 are amplified, filtered and sampled by audio processor 150 and passed to transmitter 145 as a digital audio signal. Transmitter 145 encodes the digital signal using a speech encoding scheme. The speech encoding scheme may be a waveform coding technique such as pulse code modulation (PCM). To achieve a lower coding rate and save bandwidth, other encoding schemes such as differential pulse code modulation (DPCM), or adaptive differential pulse code modulation (ADPCM) may be used. Even lower bit rate encoding can be accomplished by using a linear predictive coding scheme such as a Code Excited Linear Predictive code (CELP) or Vector Sum Excited Linear Predictive code (VSELP). Other coding schemes are possible and may be employed, depending on the particular mobile radio system in use.

The coded digital signal is then channel encoded by transmitter 145, for example by means of block or convolutional coding for error protection. Finally, the digital signal is physically encoded and a carrier signal is modulated with information from the encoded digital signal and transmitted over antenna 130.

Figure 2:
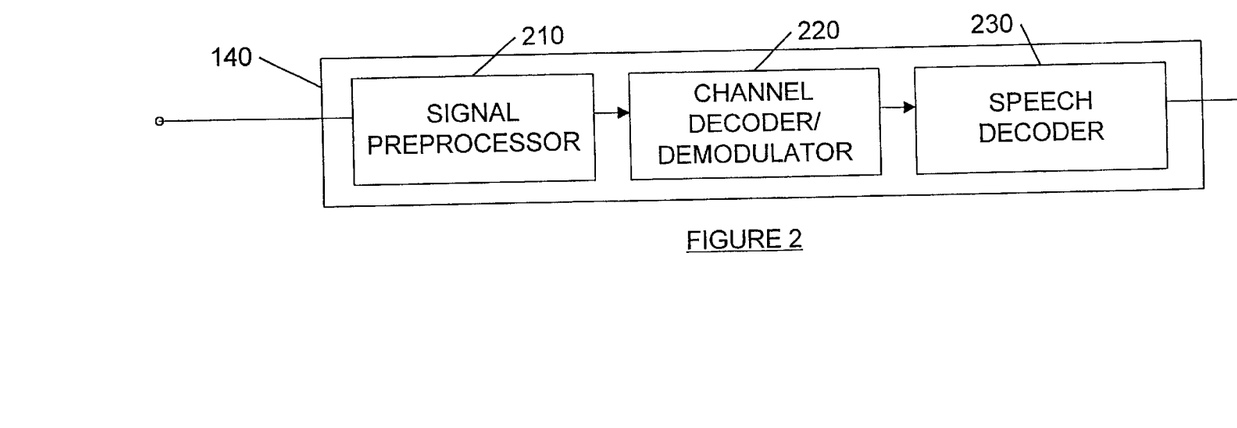
FIG. 2 is a block diagram of a mobile telephone receiver.

FIG. 2 is a block diagram of a receiver 140 in a digital mobile telephone. An RF signal received by antenna 130 is amplified, filtered and mixed to baseband in signal preprocessor 210. The received signal is then demodulated and channel decoded in channel decoder/demodulator 220. Finally, the signal is speech decoded in speech decoder 230. The decoded signals are then passed to audio processor 150 to be converted to analog and output over speaker 175.

Referring again to FIG. 1, the operation of mobile telephone 100 is controlled by microprocessor 110, which communicates with the RF circuitry through an input/output (I/O) subsystem 155. Microprocessor 110 has an associated general purpose memory 115 in which data and program instructions are stored. Microprocessor 110 is also provided with an associated static buffer 125 which may comprise a static random access memory (SRAM) memory or an electrically erasable programmable read-only memory (EEPROM). Microprocessor 110 also has an associated block of memory designated as first-in-first-out (FIFO) queue 120. FIFO queue 120 may be implemented as a logical portion of memory 115 or SRAM buffer 125 or as a separate dynamic RAM (DRAM) memory chip.

Mobile telephone 100 has a control interface 160 which controls the operation of an associated keyboard 165 and display 170. Keyboard 165 and display 170 provide user input and output functionality. Control interface 160 communicates with microprocessor 110 through I/O subsystem 155.

The received and transmitted digital signals are provided to microprocessor 110 through I/O subsystem 155. The digital signals are then combined by microprocessor 110 to form a combined audio signal, which is continuously stored in FIFO queue 120. In one embodiment, the digital signals are provided to microprocessor 110 after speech encoding (in the case of transmitted signals) and prior to speech decoding (in the case of received signals). Thus, the speech signals may be stored by microprocessor 110 in a compressed, speech encoded format.

As described above, the combined audio signal is stored in the FIFO queue 120 by microprocessor 110. The contents of the FIFO queue 120 are continuously updated, with the oldest data being overwritten by the most recent data. Thus, the received signal is continuously recorded in the FIFO queue 120, although only the last n seconds of audio data is retained.

The FIFO queue holds a given number of seconds worth of audio data depending on the size of the queue and the speech encoding scheme used. For example, if a 16 kilobit speech coder is used, then a 32 kilobyte queue can hold 16 seconds worth of audio data. Preferably, the FIFO queue 120 is large enough to hold at least 10 seconds of digitized voice signals. Each n-second segment of the audio signal stored in the FIFO queue 120 is referred to herein as a "block." The size of a block and the number of blocks contained in the FIFO queue 120 may vary depending on the particular configuration set by the user.

The control unit 160 is provided with means by which the user can issue commands to microprocessor 110. A command may be issued by pressing a designated button on the keypad 165 or by selecting an icon or a menu item on display 170. Other means of issuing a command are possible. Commands issued by the user are communicated through control interface 160 and I/O subsystem 155 to microprocessor 110.

Mobile telephone 100 is provided with means for issuing "store" and "play" commands or signals to microprocessor 110. Preferably, these functions are assigned to existing buttons that are not otherwise used during a call. In a preferred embodiment, one key on keyboard 165 is labeled the <STO> key and one key is labeled the <PLAY> key. When the <STO> key is pressed, microprocessor 110 temporarily freezes the contents of the FIFO queue 120 by suspending the process of writing to the queue 120. The contents of the FIFO queue 120 (the "block") are transferred to the SRAM buffer 125. Preferably, when a "store" command is issued and a block of audio is transferred to the SRAM buffer 125, an icon or message is displayed on the display 170 indicating the successful storage of a block of audio. The stored block may then be replayed. Upon the issuance of a "play" command, the contents of the SRAM buffer 125 are retrieved by microprocessor 110 and provided to receiver 140. Receiver 140 receives and speech decodes the audio data, and provides the decoded signal to audio processor 150. Audio processor 150 converts the digital signal to analog, amplifies the resulting analog signal and outputs it over speaker 175.

Figure 6:
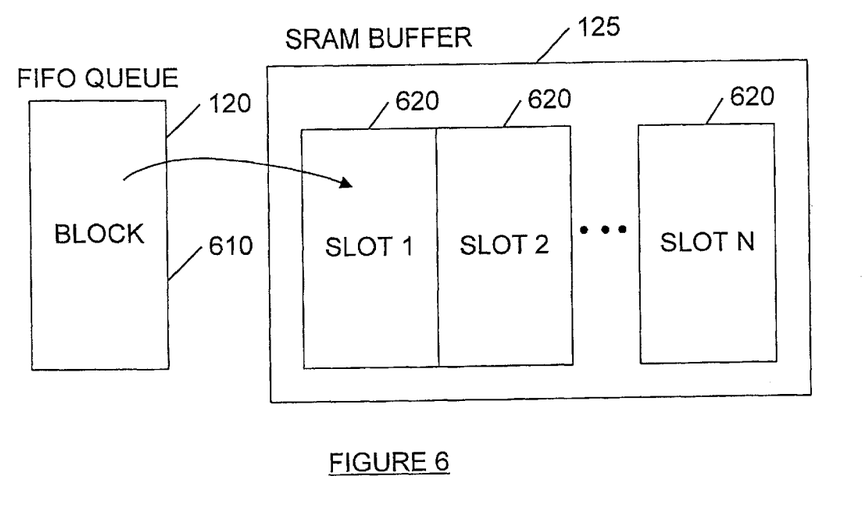
FIG. 6 is a block diagram showing the FIFO queue and the SRAM buffer employed in the present invention.
Figure 7:
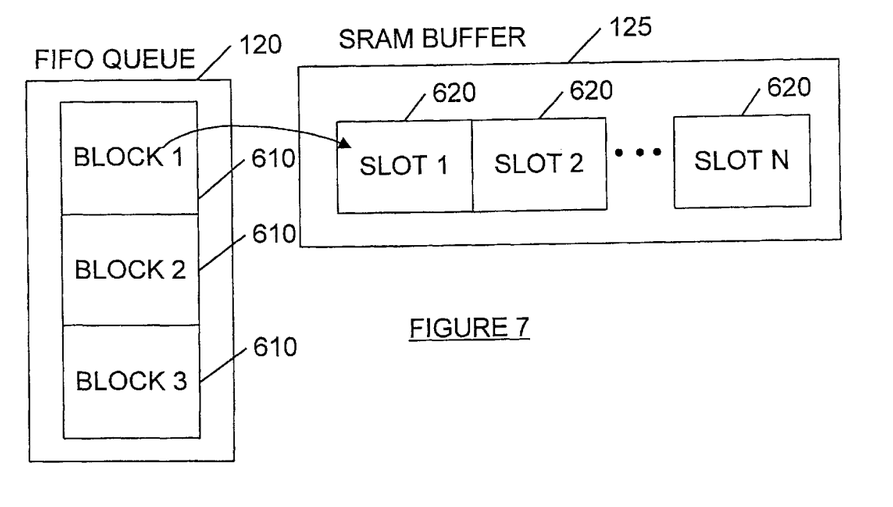
FIG. 7 is a block diagram showing the FIFO queue and the SRAM buffer employed in the present invention.

The SRAM buffer 125 may be sized to hold more than one block. In that case, the SRAM buffer 125 includes a plurality of slots, each slot being sized to hold one block. In one embodiment slot size and block size may be dynamically altered by the user for maximum efficiency. Moreover, slots may be designated by the user as protected or not protected, which will determine whether a block stored in the slot may be automatically overwritten. The structures of the FIFO queue 120 and the SRAM buffer 125 are illustrated in FIGS. 6 and 7. FIG. 6 illustrates an embodiment in which the FIFO queue 120 is sized to hold a single block 610. The SRAM buffer has multiple slots 620, each of which can hold one block 610. FIG. 7 illustrates an embodiment in which the FIFO queue 120 is sized to hold a plurality of blocks 610. Although the embodiment illustrated shows separate memory units for the FIFO queue 120 and the SRAM buffer 125, it would be an obvious modification of the present invention to implement the FIFO queue 120 and the SRAM buffer as logical divisions within the same physical memory unit.

In operation, a user hearing a small piece of conversation that he wishes to keep presses the <STO> key, and the previous n seconds worth of audio is saved in the SRAM buffer 125 for later playback. Since the SRAM buffer 125 is static, the block will remain stored for later playback even if the mobile telephone 100 is switched off. Depending on the size of the SRAM buffer 125, more than one block may be kept in storage at a time (i.e. the SRAM buffer 125 may have more than one slot).

In one embodiment, both the FIFO queue 120 and the SRAM buffer 125 are large enough to store several blocks. If the user presses the <STO> key once, only the most recently received block is stored. If the user desires to retain more than one block (i.e. more than just the last n seconds worth of conversation), he may press the <STO> key several times in succession. Thus, if the user presses the <STO> key three times in succession, the previous 3n seconds will be stored in the SRAM buffer 125 as one message. The size of the message that may be stored in this manner is limited by the size of the FIFO queue 120 and the SRAM buffer 125.

Figure 3:
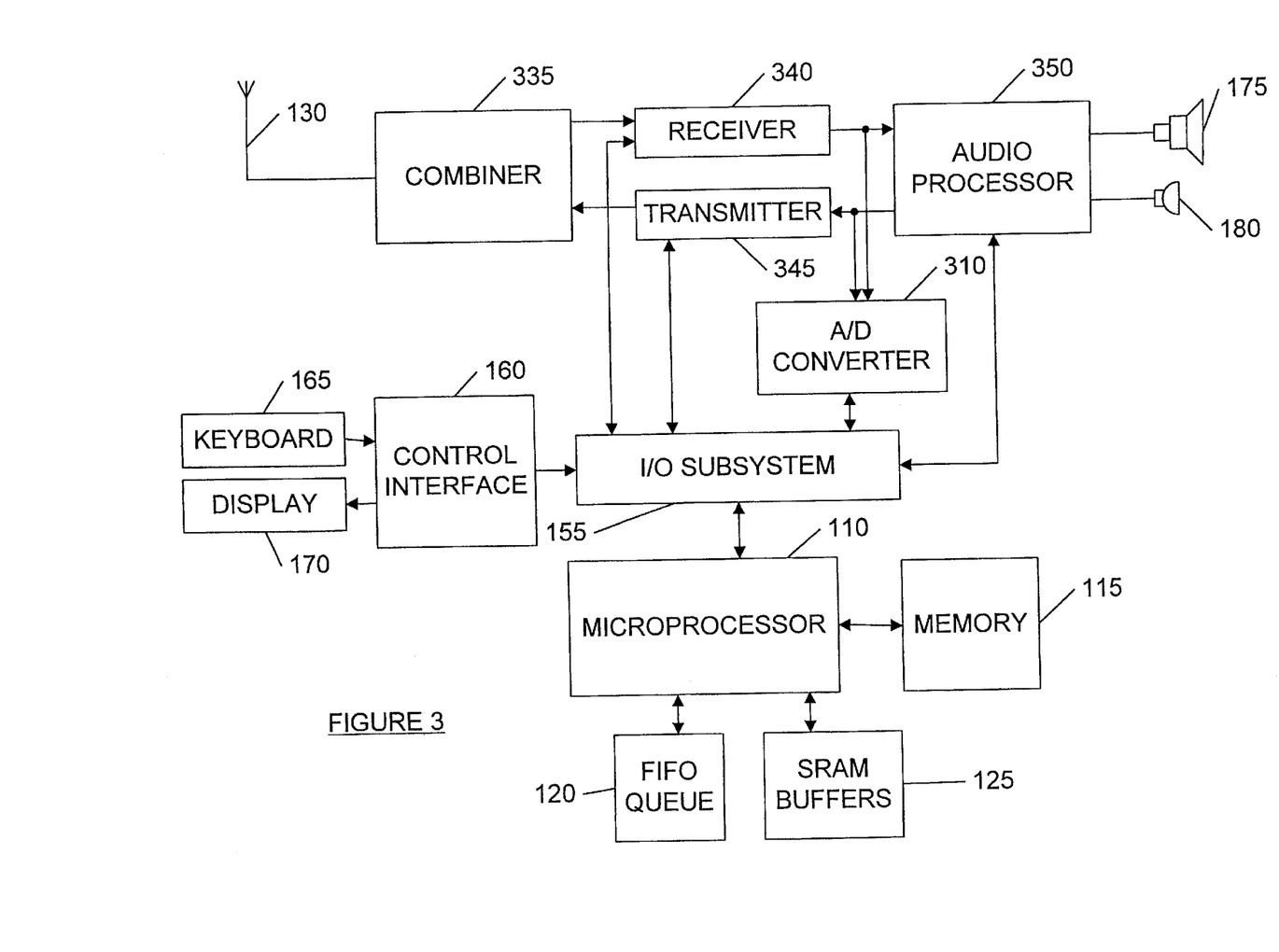
FIG. 3 is a block diagram of an embodiment of the present invention.

In an analog telephone, an additional layer of A/D and D/A conversion is performed by A/D converter 310, as shown in FIG. 3. The received and transmitted signals are each sampled and quantized by A/D converter 310, and the quantized samples are communicated to microprocessor 110 through I/O subsystem 155. Microprocessor 110 then combines the signals and stores the combined audio signal in the FIFO queue 120. In the embodiment shown in FIG. 3, speech coding may be performed by the microprocessor 110 prior to storing the combined signal in order to conserve storage space. In one embodiment, the speech coding method employed by microprocessor may be selected by the user through a menu option. For example, a user may prefer to store the most number of messages possible without regard for speech quality. In such a case, the user may select a low-bit rate predictive coding technique such as CELP or VSELP. On the other hand, if the user prefers to use more storage space in return for higher tonal quality, he or she may select a high-bit rate waveform coding method such as PCM.

The present invention may also be used to record and store voice messages outside of phone conversations. For example, the mobile telephone 100 may be configured such that, if no phone conversation is in progress, the microprocessor 110 starts recording audio from the microphone 180 when the <STO> key is pressed once. Pressing the <STO> key a second time would store a block in the SRAM buffer and stop the recording process. The user could then play the recorded message by pressing the <PLAY> key.

Figure 4:
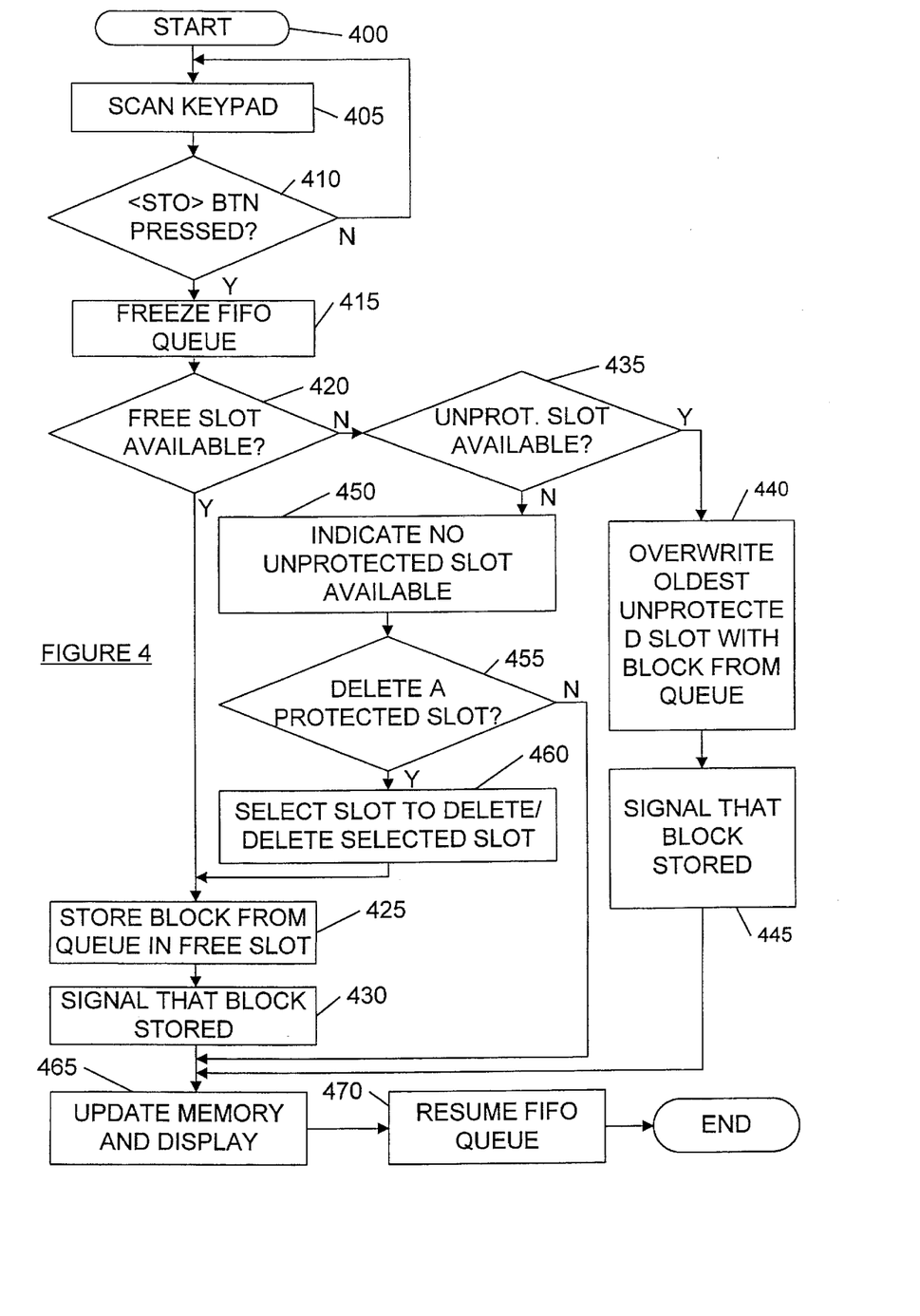
FIG. 4 is a flowchart illustrating the operation of an embodiment of the present invention.
Figure 5:
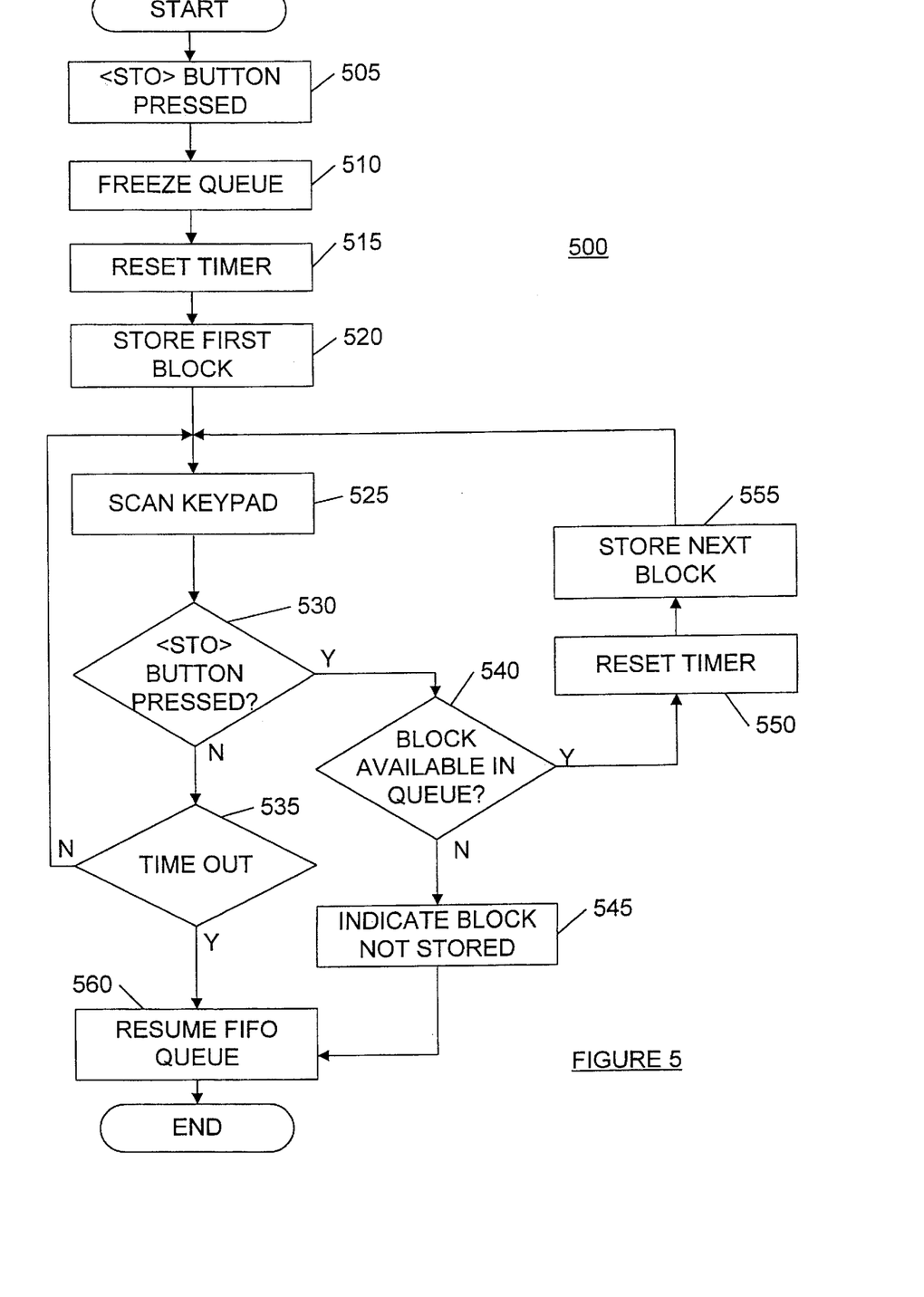
FIG. 5 is a flowchart illustrating the operation of an embodiment of the present invention.

The logical operation of the present invention is described in the flowcharts shown in FIGS. 4 and 5. FIG. 4 shows the operation of the embodiment in which only one block at a time is kept in the FIFO queue 120. The record function is activated by the user prior to step 400. Activation may be done through a menu or configuration setting, and does not have to be repeated each time the mobile telephone 100 is powered on. Once the record function has been activated, microprocessor 110 continuously stores the digital audio signal in FIFO queue 120.

When the record function is activated, microprocessor 110 continuously scans the keyboard 165 to determine if the store button has been pressed (step 410). Once the microprocessor 110 detects that the store button has been pressed in step 410, it freezes the FIFO queue 120 (i.e. stops writing new audio data to the FIFO queue 120) in step 415. Next, the microprocessor 110 checks in step 420 to see if there is a free slot available in the SRAM buffer 125 to store the block. If so, microprocessor 110 transfers the contents of the queue to the free slot in the SRAM buffer 125 in step 425, and in step 430 signals the user that the block was successfully stored. If not (i.e. if there is no free location), the microprocessor 110 checks to see if there are any unprotected slots in the SRAM buffer 125 in step 435. If there is an unprotected slot, then in step 440, the microprocessor 110 overwrites that slot with the contents of the FIFO queue 120 in step 440 and signals the user in step 445 that the block has been successfully stored. The signal generated in step 445 may also indicate to the user that an unprotected slot was overwritten in order to store the block. This indication may be done by means of an icon or a unique tone.

Whether a particular slot is protected or not may be set as a user option or may be selected as a menu option. If no unprotected slot is available, microprocessor 110 indicates in step 450 that no unprotected slot is available, preferably by means of an audible alarm. Microprocessor 110 then queries the user as to whether a protected slot should be overwritten (step 455). If the user indicates that a protected slot should be overwritten, then in step 460 the user is invited to select the slot that is to be overwritten. Once the slot to be overwritten is identified, then the microprocessor 110 proceeds in step 425 to store the block in the identified slot and in step 430 to signal that the block was successfully stored.

Microprocessor 110 then updates its memory and display with information relating to the current status of the SRAM buffer, for example with the number of free slots, number of protected slots, etc., in step 465. Finally, in step 470, microprocessor 470 resumes writing audio data to the FIFO queue 120. If in step 455 the user opts not to overwrite an existing protected slot, then the microprocessor proceeds to step 465, updates the display and resumes the FIFO queue 120.

FIG. 5 shows the operation of an embodiment in which the FIFO queue 120 is sized to hold more than one block at a time, thus permitting the user to store multiple blocks if desired by pressing the store key several times in succession.

As shown in FIG. 5, when the store button is initially pressed (step 505), microprocessor 110 freezes the FIFO queue (step 510) and starts a timer (step 515). The length of the timer is be preset and may be changed by a user option. Microprocessor 110 then stores the first block (corresponding to the most recently stored block in the FIFO queue 120) by following a process similar to that described with reference to FIG. 4 (i.e. first determining if a free or unprotected block is available). After storing the first block, microprocessor 110 then scans the keypad to see if the store button has been pressed again (steps 525, 530). If not, microprocessor 110 then checks in step 535 to see if the timer has expired. If the timer has expired, microprocessor 110 resumes the FIFO queue 120 in step 560. If the timer has not expired, microprocessor 110 returns to step 525 and scans the keypad again. If the store button has been pressed, microprocessor 110 checks in step 540 to see if there is a remaining block of unstored data in the FIFO queue 120. If so, microprocessor 110 resets the timer and stores that block in steps 550 and 555. If not (i.e. the user has pressed the store button more times than there are blocks available in the queue to be stored), then microprocessor 110 indicates to the user that no block was stored (preferably by means of an audible signal) in step 545, and resumes the FIFO queue 120 in step 560.

While the present invention has been described with respect to its preferred embodiment, those skilled in the art will recognize that the present invention is not limited to the specific embodiment described and illustrated herein. Different embodiments and adaptations besides those shown herein and described as well as many variations, modifications and equivalent arrangements will now be apparent or will be reasonably suggested by the foregoing specification and drawings, without departing from the substance or scope of the invention.

What is claimed is:

1. Apparatus comprising:
 a circuit for carrying a first and a second audio signal;
 a microprocessor coupled to said circuit and receiving said first and second audio signal from said circuit;
 a first memory coupled to said microprocessor for storing a predetermined length of said audio signal on a first-in-first-out basis, said first memory including a plurality of blocks of memory wherein said microprocessor combines said first audio signal and said second audio signal prior to storing said signals in said first memory;
 a second memory coupled to said microprocessor;
 means for transferring a first block of said plurality of blocks to said second memory in response to a first user command;
 means for freezing the contents of said first memory in response to said first user command; and
 means for transferring a second block of said plurality of blocks to said second memory in response to the receipt of a second user command within a predetermined period of time.

2. The apparatus of claim 1, wherein said first audio signal is a digital audio signal.

3. The apparatus of claim 2, wherein said digital audio signal is encoded using a speech coding method.

4. The apparatus of claim 3, wherein said speech coding method is a waveform coding method.

5. The apparatus of claim 3, wherein said speech coding method is a linear predictive coding method.

6. The apparatus of claim 1, wherein said first audio signal is an analog signal, said apparatus further comprising conversion means coupled to said microprocessor for converting said first analog audio signal into a digital audio signal prior to storing said predetermined length of said audio signal.

7. The apparatus of claim 6, wherein said microprocessor is configured to encode said digital audio signal using a speech coding method prior to transferring said first block of said plurality of blocks from said first memory to said second memory.

8. The apparatus of claim 7, wherein said speech coding method is a waveform coding method.

9. The apparatus of claim 7, wherein said speech coding method is a linear predictive coding method.

10. The apparatus of claim 7, wherein the speech coding method is selectable in response to a user command.

11. The apparatus of claim 1, wherein said second memory comprises a static memory.

12. The apparatus of claim 1, wherein said second memory comprises static random access memory (SRAM).

13. The apparatus of claim 1, wherein said second memory comprises electrically erasable programmable read only memory (EEPROM).

14. The apparatus of claim 1, further comprising:
conversion means for converting said first block of said plurality of blocks in said second memory to an analog audio signal; and
a speaker coupled to said conversion means for playing said analog audio signal responsive to a second user command.

15. The apparatus of claim 1, wherein said first memory and said second memory are logical portions of a single physical memory unit.

16. A mobile telephone comprising:
a transmitter for transmitting a transmit digital audio signal;
a receiver for receiving a receive digital audio signal;
an audio processor coupled to said transmitter and said receiver;
a microprocessor coupled to said transmitter, said receiver and said audio processor;
a first memory configured as a first-in-first-out queue, said first memory including a plurality of blocks of memory; and
a second memory;
wherein said microprocessor receives and combines said receive digital audio signal and said transmit digital audio signal prior to continuously storing said signals in said first memory;
wherein said microprocessor transfers a first block of said plurality of blocks from said first memory to said second memory in response to a first user command;
wherein said microprocessor ceases to store said signals in said first memory in response to said first user command; and
wherein said microprocessor transfers a second block of said plurality of blocks to said second memory in response to the receipt of a second user command within a predetermined period of time.

17. The mobile telephone of claim 16, further comprising:
a speaker coupled to said audio processor;
wherein said microprocessor transmits said first block of said plurality of blocks in said second memory to said audio processor as a digital message signal in response to a second user command, and said audio processor converts said digital message signal into an analog signal and broadcasts said analog signal over said speaker.

18. The mobile telephone of claim 17, wherein said microprocessor decodes said digital audio signal using a speech decoding method prior to transmitting said digital audio signal to said audio processor.

19. A mobile telephone comprising:
a transmitter for transmitting a transmit digital audio signal;
a receiver for receiving a receive digital audio signal;
an audio processor coupled to said transmitter and said receiver;
a microprocessor coupled to said transmitter said receiver and said audio processor;
a first memory configured as a first-in-first-out queue; and
a second memory;
wherein said microprocessor receives said receive digital audio signal and said transmit digital audio signal and continuously stores said signals in said first memory; and
wherein said microprocessor transfers the contents of said first memory to said second memory in response to a first user command;
wherein said microprocessor combines said receive digital audio signal and said transmit digital audio signal prior to storing said signals in said first memory.

20. A method of recording a voice message in an electronic device comprising the steps of:
receiving a first digital audio signal and a second digital audio signal that corresponds to the voice message;
combining said first digital audio signal and said second digital audio signal;
continuously storing said combined first and second digital audio signal corresponding to the voice message in a first memory on a first-in-first-out basis, said first memory comprising a plurality of blocks of memory;
responsive to a first user command, ceasing to store said signal in said first memory and transferring one of said plurality of blocks of memory from said first memory to a second memory; and
responsive to a second user command within a predetermined period of time after said first user command, transferring a second block of said plurality of blocks to said second memory.

21. The method of claim 20, further comprising the step of:
responsive to a third user command, playing the contents of said second memory over a speaker.

22. A method of storing a portion of a first and a second digital audio signal in a mobile telephone having a first memory configured as a first-in-first-out (FIFO) queue and including a plurality of blocks, a second memory having a plurality memory slots, a keypad having a first function key, a circuit for carrying the digital audio signal, and a microprocessor coupled to the first memory, the second memory, the keypad and the circuit, said method comprising the steps of:
combining the first and second digital audio signal prior to storing the combined digital audio signal in the first memory;
continuously storing said combined digital audio signal in the first memory;
scanning said keypad to determine if said first function key has been pressed;
if said first function key has been pressed, ceasing to store said combined digital audio signal in said first memory and determining whether there is a free memory slot in said second memory; and
if a first memory slot in said second memory is free, transferring one of said plurality of blocks of memory from said first memory to the free slot in the second memory;
responsive to a second user command within a predetermined period of time after said first function key has been depressed, determining whether there is a free memory slot in said second memory; and if a second memory slot in said second memory is free, transferring a second one of said plurality of blocks of memory from said first memory to the second slot in the second memory.

23. The method of claim 22, further comprising the steps of:

if no memory slot in the second memory is free, determining if one of the memory slots in the second memory is protected; and if a memory slot in the second memory is unprotected, transferring one of said plurality of blocks of memory from said first memory to the unprotected slot in the second memory.

24. The method of claim 23, further comprising the steps of:

if no memory slot in the second memory is unprotected, prompting a user of the mobile telephone to determine if a protected memory slot may be overwritten.

25. A method of storing a portion of a digital audio signal in a mobile telephone having a first memory configured as a first-in-first-out (FIFO) queue, a second memory having a plurality memory slots, a keypad having a first function key, a circuit for carrying the digital audio signal, and a microprocessor coupled to the first memory, the second memory, the keypad and the circuit, said method comprising the steps of:

continuously storing the audio signal in the first memory;

scanning the keypad to determine if said first function key has been pressed;

if said first function key has been pressed, setting a timer and storing a first portion of the audio signal stored in the first memory in a first memory slot of the second memory;

scanning the keypad to determine if said first function key has been pressed again;

if said first function key is pressed within a predetermined timeout period, storing a second portion of the audio signal stored in the first memory in a second memory slot of the second memory.

* * * * *